US006463812B2

(12) United States Patent
Dubois

(10) Patent No.: US 6,463,812 B2
(45) Date of Patent: Oct. 15, 2002

(54) METHOD AND DEVICE FOR THE SIMULATION OF LOADS ON LIFTING APPLIANCES

(75) Inventor: Frederic Dubois, Charlieu (FR)

(73) Assignee: Potain, Ecully (FR)

( * ) Notice: Subject to any disclaimer, the term of this patent is extended or adjusted under 35 U.S.C. 154(b) by 0 days.

(21) Appl. No.: 09/843,925

(22) Filed: Apr. 30, 2001

(65) Prior Publication Data

US 2002/0011121 A1 Jan. 31, 2002

(30) Foreign Application Priority Data

May 12, 2000 (FR) ........................................... 00 06097

(51) Int. Cl.[7] ................................................ G01L 1/26
(52) U.S. Cl. ................................................ 73/862.393
(58) Field of Search ......................... 73/788, 796, 826, 73/831, 862.393, 862.392, 862.391

(56) References Cited

U.S. PATENT DOCUMENTS

| | | | | |
|---|---|---|---|---|
| 3,827,514 A | * | 8/1974 | Bradley | 177/147 |
| 4,121,293 A | * | 10/1978 | Kerr et al. | 254/267 |
| 4,324,385 A | * | 4/1982 | Cojean et al. | 254/270 |
| 4,459,752 A | * | 7/1984 | Babcock | 33/772 |
| 4,509,377 A | | 4/1985 | Mentzell | |
| 4,643,031 A | | 2/1987 | Mentzell | |
| 5,358,219 A | * | 10/1994 | Shenk et al. | 212/273 |

FOREIGN PATENT DOCUMENTS

| | | |
|---|---|---|
| DE | 21 40 779 A | 3/1973 |
| DE | 33 41 414 A | 5/1985 |
| DE | 36 44 451 A | 7/1988 |
| EP | 0 866 022 A | 9/1998 |

* cited by examiner

*Primary Examiner*—Max Noori
(74) *Attorney, Agent, or Firm*—Oliff & Berridge, PLC

(57) ABSTRACT

The method is intended for setting the force limiters of a lifting appliance equipped with a winch-type lifting mechanism (8), the electric motor of which is controlled by a variable-speed drive unit ensuring regulation of the drive torque.

This method involves:

- mounting a direct-reading or remote-reading balance (23) between the lifting hook (5) and a fixed point (27),
- placing the lifting mechanism in a "setting" mode,
- displaying desired values for the limitation of the nominal drive torque, commanding the lifting function in the raising direction by means of the control of the said electric motor and reading the tensile force values (F) supplied by the balance (23).

The invention applies more particularly to the setting of the force limiters on tower cranes.

12 Claims, 2 Drawing Sheets

METHOD AND DEVICE FOR THE SIMULATION OF LOADS ON LIFTING APPLIANCES

The invention relates to a method for the simulation of loads on lifting appliances, in particular on tower cranes, for the purpose of setting the load limiters of the lifting appliances. This invention is also aimed at a device for carrying out the method. The invention applies to any lifting appliance equipped with a winch-type lifting mechanism, the electric motor of which is controlled by a variable-speed drive unit ensuring regulation of the drive torque.

The conventional procedures for setting the load limiters of a lifting appliance employ actual calibrated loads as a source of the load, the setting being carried out within the following context (with regard to a tower crane).

The function of load limiters is to limit the forces which are attributable to the load suspended on the lifting hook and which are applied to the structure of the crane to acceptable values for which this crane is calculated and designed. A safety margin of 10% is usually provided, in order to take into account the accuracy of the force measurement systems and the dynamic increases attributable to the accelerations during lifting.

The sequence of the operations for setting the load limiters is established so as to protect the personnel carrying out the settings and the equipment against any possible false maneuver. The setting of the torque limiters is therefore carried out before that of the load limiters.

The load limiters are set when the crane is commissioned, at the time of any change in the configuration of the crane and also, in general, at least once a year as a periodic check.

The conventional setting principle, with a device having mechanical sensors, is as follows:

It will be assumed here, as an illustrative example, that the maximum-load limiter of a tower crane is to be set, the permissible maximum load being 10 tonnes. A calibrated load of 10 tonnes is suspended on the hook of the crane, and the device for setting the limiter is brought to the cut-off limit. The lifting of this load at the nominal speed provided is then commanded, and, if lifting does not take place, the setting is repeated in order to make it possible.

The load is then lowered, and an additive load of 10%, that is to say one tonne in the example in question, is added to it. A check is made that the movement of lifting this increased load (equal, here, to 11 tonnes) is impossible, otherwise the setting is repeated in order to bring about the cut-off.

Finally, a check is made that the lifting of the nominal load of 10 tonnes is still possible.

Setting procedures using a device with electronic sensors are also known. By means of such devices, calibration is carried out with any load having a value matched to the scale of loads of the crane, but not made mandatory. The other loads and the torque resulting from each load are calculated automatically by an electronic computer. Despite the use of electronic means, this method still has the disadvantage of requiring at least one actual calibrated load.

In addition to these conventional methods, there are so-called "load simulation" techniques, making it possible to carry out settings without the need for actual calibrated loads.

Thus, in the field of tower cranes, a device for the simulation of loads with the aid of a motor-driven pump or of a jack has already been proposed. The jack is mounted in the region of the mechanical amplifier of the load limiters, in order to exert a pull on this. The load is simulated with the aid of a hydraulic pressure delivered by the motor-driven pump and given by a "pressure/load" cross-reference table. This device does not make it possible to simulate a torque attributable to a load, since it is located in the region of the mechanical sensor of the load limiters.

In the light of this prior art, the object of the invention is to avoid the need for calibrated loads in order to carry out the settings of the load limiters on tower cranes and therefore to limit the operations of handling such loads and also the duration and cost of these settings, whilst also making it possible to set the torque limiters.

To achieve this, the subject of the invention is essentially a method for the simulation of loads on lifting appliances, in particular on tower cranes, the said method involving:

- mounting a balance between the lifting hook and a fixed point,
- placing the lifting mechanism, with regulation of the drive torque, in a "setting" mode,
- displaying desired values for the limitation of the drive torque, commanding the lifting function by means of the control of the said electric motor in the raising direction and reading the tensile force values supplied by the balance.

According to one embodiment, the balance is fastened, at one of its ends, at a fixed point anchored on the ground or is lashed by means of this end to the structure of the crane. In an alternative embodiment, the balance is attached, by one of its ends, to a free mass having a value greater than that of the maximum load to be measured, so that this mass is the equivalent of a fixed point. In any event, the other end of the balance is attached to the lifting hook of the crane.

The method according to the invention may comprise the use of a direct-reading balance, that is to say a balance incorporating a means for displaying the tensile force exerted on this balance. In this case, an operator must be present in the vicinity of the balance, in order to read the displayed values and transmit them to another operator responsible for carrying out the setting, who is usually stationed on the structure of the crane, in particular in the region of the electrical control cabinet of the lifting mechanism.

In an advantageous variant, the method which is the subject of the invention comprises the use of a remote-reading balance, that is to say a balance with means for the remote transmission of the measured tensile force values towards a measured-value display casing which is preferably located within the immediate range of the operator responsible for carrying out the setting. This variant therefore no longer requires the presence of a second operator for reading the measurement given by the balance, and it also avoids any error in communication between operators.

More particularly, the direct-reading or remote-reading balance being in place, and the lifting mechanism having been switched to the "setting" mode, for example by the display or validation of an access code on the control keypad of the variable-speed drive unit which controls the motor actuating the lifting winch, the process of setting the limitation of a load involves, in order to measure the load:

- displaying a desired value for the limitation of the drive torque, for example in the form of a percentage of the nominal torque, the said desired value being slightly below that of the load table of the crane (for example: 90%),
- commanding the lifting function in the raising direction, until the winch is immobilized, the balance then being subjected to a tensile force corresponding to the previously displayed desired value of the limitation of the torque, reading the force value supplied by the balance (for example: 5.1 tonnes), increasing the desired torque-limitation value until the correct value given by the load table (for example: 5.2 to 5.3 tonnes) is obtained at the balance, if the required value is exceeded, commanding the lifting function in the lowering direction and repeating the preceding phases, whilst at the same time resetting the desired torque-limitation value, finally, releasing the control, so that the brake acts and immobilizes the winch in position, the force being maintained at the same value at the balance.

The process in question involves, furthermore, with regard more particularly to the setting of a load limiter:

bringing the load limiter to the cut-off limit, commanding the lifting function in the lowering direction until the lifting cable is slackened, stopping the crane, until the variable-speed drive unit is completely deactivated (for a time given by the technical specification of the crane, which may be approximately 30 seconds), putting the crane into operation again, commanding the lifting function in the raising direction at low speed, the load limiter then stopping the movement and the brake being activated, reading the force value supplied by the balance and checking that this value is between the nominal load value and the said nominal value increased by a predetermined quantity (for example: nominal value +10%), the setting operation being terminated if this last condition is verified, whereas, otherwise, that is to say if the value supplied by the balance is below or equal to the nominal load or greater than this nominal load increased, for example, by 10%, the above-described procedure is started again from the beginning.

It is thereby possible, on the basis of the measurement supplied by the balance, to carry out the setting of the load limiter, the function of which is to prevent the exceeding of the nominal load for which the gantry of a crane and its lifting winch are calculated and produced.

It is recalled that the lifting winch usually allows different lifting speeds:

microspeed (with maximum load), low speed (which is the nominal speed of the maximum load), high speed, overspeed (only during lowering).

The loads suspended on the lifting hook transmit a load-proportional tensile force in the strand of the lifting cable coming from the drum of the lifting winch. This force is transmitted to the pulleys over which the cable passes or to the drum. The force measurement device is therefore located either in the region of the drum, which thus forms a weighing drum, or in the region of a cable guide pulley, which then forms a weighing pulley; this measurement device possesses a mechanical amplifier which controls the load limiters.

To obtain maximum setting accuracy, it is customary to provide separate switches for microspeed and low speed, this being in order to take into account different dynamic effects, even though the loads allowed are the same in both cases.

In view of the above, the settings of the limiters (carried out according to the above-defined procedure) take place preferably in the following order:

1. overspeed switch,
2. high-speed switch,
3. low-speed switch,
4. microspeed switch.

Moreover, these settings take place preferably within a minimum range, that is to say with the axis of the lifting hook located as near as possible to the base of the crane, and also preferably (in the case of a block and tackle with a number of strands capable of being modified for the lifting cable) with a two-strand block and tackle, for which the forces attributable to the accelerations are greater than with a block and tackle having four strands or more.

The complete setting also comprises a setting of the switches of the maximum-load moment limiter, and it is recalled here that the load moment is the product of the rolling load (carriage+block+hook+rated load) and the distance between the point of origin of the constant moment, which is a function of the type of crane, and the axis of the hook. The setting of the switches of the maximum-load moment limiter may theoretically be carried out for any load between the maximum load and the jib-point load of the crane, within the nominal range corresponding to this load, read from the load diagram. In order to carry out this setting, the process for measuring a load with the aid of the balance, as defined above, may be used.

For carrying out the above-defined method for the simulation of loads, the necessary device comprises essentially a (direct-reading or remote-reading) balance used in combination with means for regulating the drive torque and for regulating the speed, which are integrated in or associated with the variable-speed drive unit which controls the electric motor actuating the lifting winch of the crane, with means for displaying a process for setting the force limiters, the balance being provided in order to be mounted between the lifting hook and a fixed point, the assembly making it possible to simulate a load by the generation of a torque in the motor, whilst measuring the value of this load. Preferably, the display means comprise a control keypad for displaying the "setting" mode by means of a code, for displaying a desired drive-torque value and, if appropriate, for commanding the lifting movement in the raising and the lowering direction.

The advantages of the method and of the device which are the subject of the invention are, as a whole, as follows:

The invention avoids the need to resort to calibrated loads, of which there are usually four or five separate loads, for the setting of forces, also eliminating any transport and any handling of such loads.

The setting of a load limiter may be carried out by a single operator in the case of the use of a remote-reading balance.

The system makes it possible to dispense with any load error or error in communication between an operator on the ground and the operator responsible for the setting (in the case of a remote-reading balance).

The setting operations are simplified and made quicker and less costly, whilst the desirable accuracy is preserved.

The invention will be understood more clearly with the aid of the following description, with reference to the accompanying diagrammatic drawing which illustrates by way of non-limiting example an embodiment of this device for the simulation of loads on lifting appliances:

Figure 1:
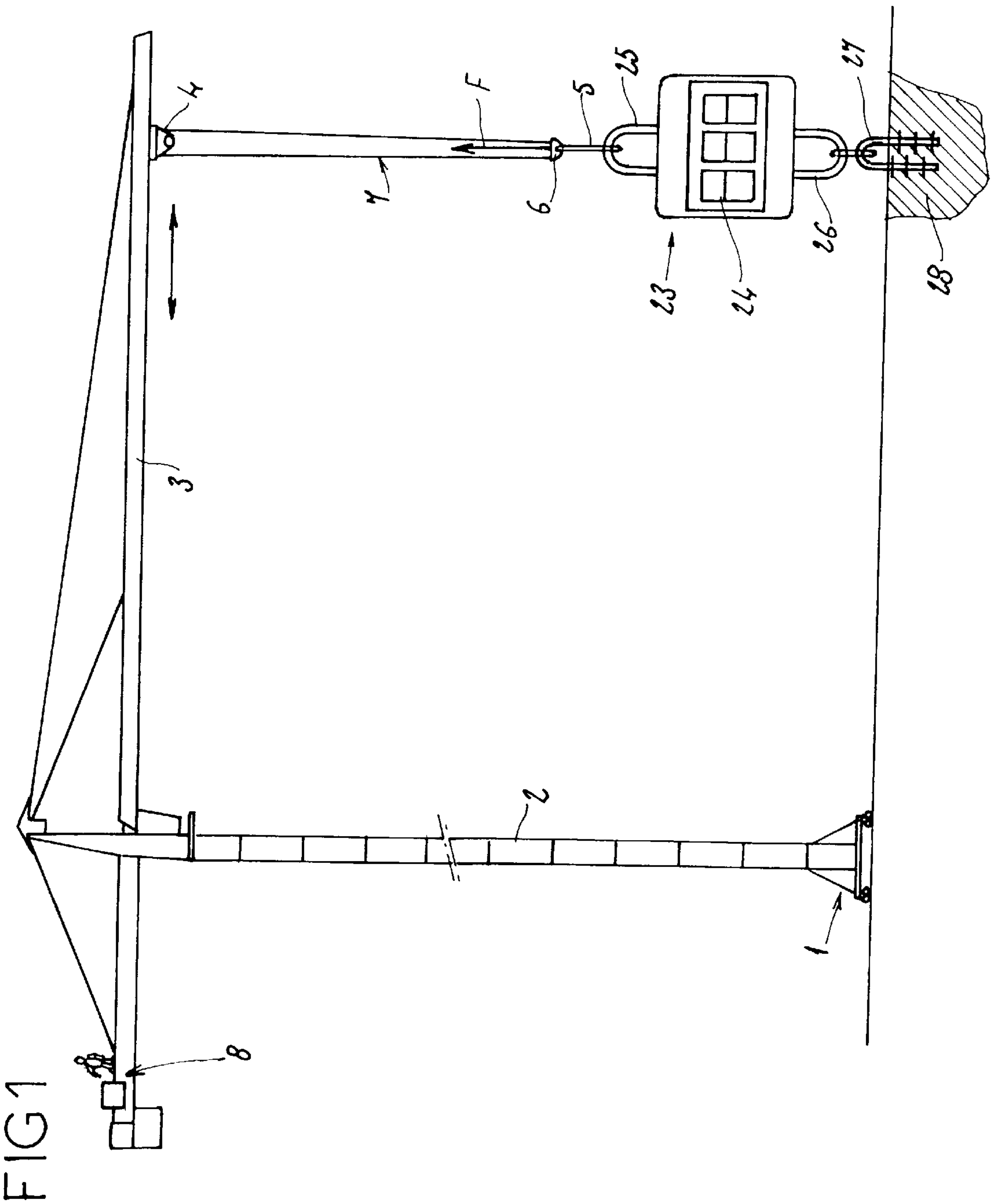
FIG. 1 is a general diagrammatic view of a tower crane during setting by means of the method for the simulation of loads which is the subject of the invention.

FIG. 1 illustrates a tower crane, with its base 1, its pillar 2 and its distributing jib 3, along which a carriage 4 is displaced. The crane ensures the lifting of loads by means of a hook 5, connected to a block 6, and of a lifting cable 7 which forms at least two strands below the carriage 4, one of the strands of the cable 7 being wound on the drum of a lifting winch 8.

Figure 2:
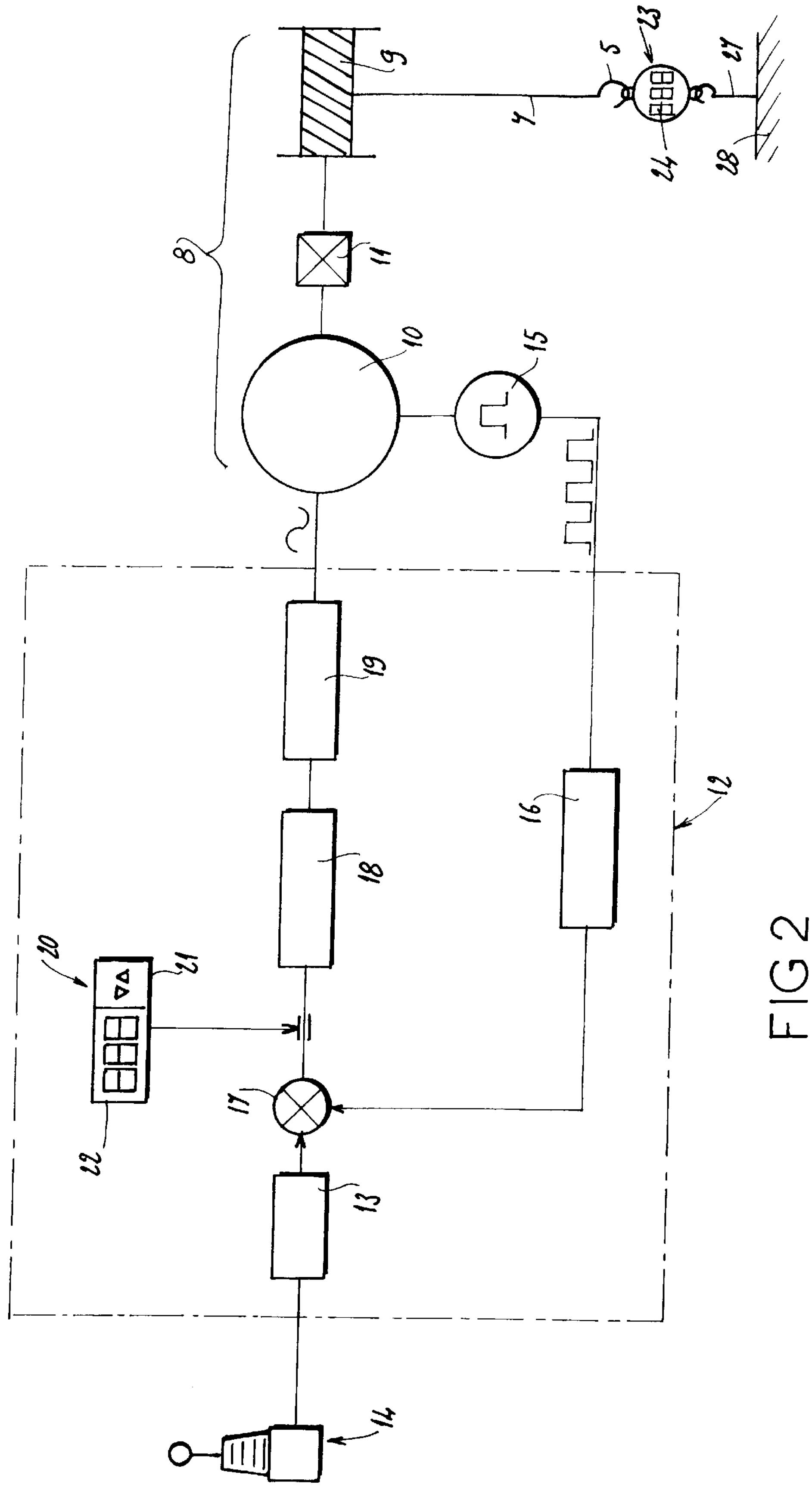
FIG. 2 is a block diagram illustrating the device of the invention, associated with a variable-speed drive unit.

FIG. 2 shows the lifting winch 8 diagrammatically, with its drum 9 driven in rotation from an electric motor 10 by means of a reducer 11.

The motor 10 is controlled by a variable-speed drive unit 12 which receives at an input a speed reference 13 supplied by a control lever 14 of the "controller" type.

A speed sensor 15 associated with the motor 10 supplies a speed return signal 16 at another input of the variable-speed drive unit 12, and a subtracter 17 determines at any moment the deviation between the speed reference 13 and the actual instantaneous speed given by the return signal 16.

The motor 10 is controlled, from the subtracter 17, by means of a regulating stage 18 and a power stage 19.

A torque limitation member 20 also acts on the regulating stage 18. The member 20 comprises a control keypad 21 and a display 22 indicating a code or a numerical value.

The functions of speed regulation and of torque regulation, as illustrated diagrammatically in FIG. 2, are conventionally integrated in all the types of variable-speed drive units used on tower cranes.

The device comprises, as an external means, a balance 23 which, in the example illustrated, is a direct-reading balance, that is to say it comprises, placed directly on it, a display 24 indicating the value of a tensile force F measured by this balance 23. In a variant, not illustrated, the balance 23 is of the remote-reading type, the measured value being displayed on a remote casing within the range of vision of the operator responsible for carrying out the setting, this operator being stationed in the vicinity of the lifting winch 8.

The balance 23, in order to be used, is attached by its upper end 25 to the lifting hook 5. The other end 26, or lower end, of the balance 23 is fastened to a fixed point 27 anchored in the ground 28; in a variant, not illustrated, this end 26 of the balance 23 is attached to a free mass, but the weight of which is greater than the force to be applied, so that this mass will not be lifted and will be the equivalent of a fixed anchoring point.

With the balance 23 being installed in this way, the setting process is initiated by the display of an access code, allowing the control of the limitation of the torque delivered by the motor 10, and by validating the access code with the aid of the control keypad 21 of the limitation member 20.

This setting process itself comprises, in particular, the operation of displaying on the display 22 a desired value for the limitation of the torque of the motor 10, such that the control of this motor 10 with the torque thus determined simulates a load, in that the balance 23 is subjected to a tensile force F corresponding to this torque. The value of the tensile force F, the said value being indicated by the display 24 of the balance 23, can then be read, and, on the basis of this, the setting process can be continued (according to the general description already given above). This process may be controlled, as regards the lifting movement in the raising and lowering direction, by the use of the existing control lever 14; in an advantageous variant, the control of the lifting movement in the raising and lowering direction is ensured by the control keypad 21, thus allowing a centralized control of the entire setting process.

The scope of the invention, as defined in the accompanying claims, would not be exceeded:

- by carrying out the lashing of the balance in a different way, for example at a point on the crane itself;
- by implementing the method with variable-speed drive units of all types allowing a control of the drive torque, such as: variable-frequency unit, variable-voltage unit or variable direct-current unit;
- by applying the same method and device to all types of lifting appliances, other than tower cranes, equipped with a cable winch, the motor of which is controlled by a variable-speed unit.

What is claimed is:

1. Method for the simulation of loads on a lifting appliance for the purpose of setting a load limiter of the lifting appliance, the lifting appliance being equipped with a winch-type lifting mechanism, the lifting mechanism having an electric motor which is controlled by a variable-speed drive unit ensuring regulation of a drive torque, comprising:

- mounting a balance between a lifting hook and a fixed point,
- placing the lifting mechanism, with regulation of the drive torque, in a "setting" mode,
- displaying desired values for a limitation of the drive torque,
- commanding a lifting function in a raising direction by means of the control of the electric motor, and
- reading tensile force values supplied by the balance.

2. The method according to claim 1, wherein the balance is fastened, at one of its ends, to a fixed point anchored on the ground or is lashed by means of the one of its ends to a structure of the crane.

3. The method according to claim 1, wherein the balance is attached, by one of its ends, to a free mass having a value greater than that of a maximum load to be measured.

4. The method according to claim 1, wherein the lifting mechanism is switched to the "setting" mode by the display and validation of an access code on a control keypad of the variable-speed drive unit which controls the motor actuating the lifting winch.

5. Method according to claim 1, wherein the process of setting the limitation of a load involves, in order to measure the load:

- displaying a desired value for the limitation of the drive torque, the desired value being slightly below that of the load table of the lifting appliance;
- commanding the lifting function in the raising direction, until the winch is immobilized, the balance then being subjected to a tensile force corresponding to the displayed desired value of the limitation of the torque;
- reading the force value supplied by the balance;
- increasing the desired torque-limitation value until the correct value given by the load table is obtained at the balance;
- if the correct value is exceeded, commanding the lifting function in the lowering direction and repeating the preceding phases, whilst at the same time, resetting the desired torque limitation value; and
- releasing a control, so that a brake acts and immobilizes the winch in position, the force being maintained at the same value at the balance.

6. The method according to claim 5, wherein it further involves,:

bringing the load limiter to a cut-off limit, commanding the lifting function in a lowering direction until a lifting cable is slackened;

stopping the lifting appliance, until the variable-speed drive unit is completely deactivated;

putting the lifting appliance into operation again;

commanding the lifting function in the raising direction at low speed, the load limiter then stopping the movement and the brake being activated;

reading the force value supplied by the balance and checking that this value is between a nominal load value and the nominal value increased by a predetermined quantity, the setting operation being terminated if this latter condition is verified, whereas, otherwise, the above described procedure is started again from the beginning.

7. The method according to claim 6, wherein it also comprises a setting of switches of a maximum-load moment limiter.

8. Device for the simulation of loads on lifting equipment, for carrying out the method according to claim 1, wherein it comprises the balance used in combination with means for regulating the drive torque and for regulating the speed, which are integrated in or associated with the variable-speed drive unit which controls the electric motor actuating the lifting winch, and with means for displaying a process for setting the force limiters.

9. The device according to claim 8, wherein the balance is a direct-reading balance incorporating a means for displaying the tensile force exerted on the balance.

10. The device according to claim 8, wherein the balance is a remote-reading balance with means for the remote transmission of measured tensile force values towards a measured-value display casing.

11. The device according to claim 8, wherein the display means comprise a control keypad for displaying the "setting" mode by means of a code, for displaying a desired drive-torque value.

12. The device according to claim 8, wherein the control keypad is for commanding the lifting movement in the raising and lowering directions.

* * * * *